(No Model.)
R. O. GERCKE.
CAR STARTER.
No. 400,560.  Patented Apr. 2, 1889.
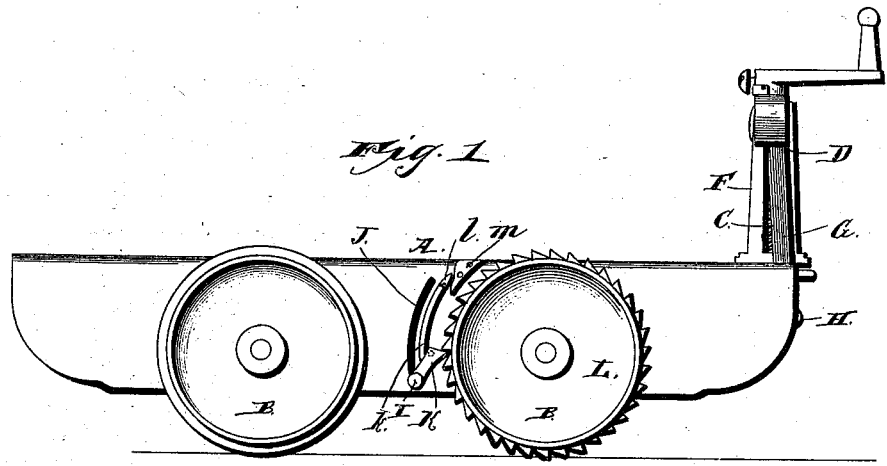
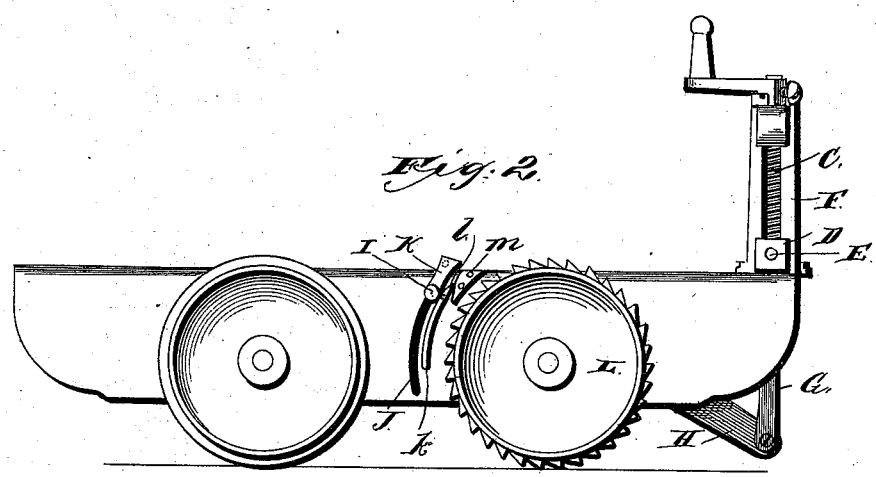
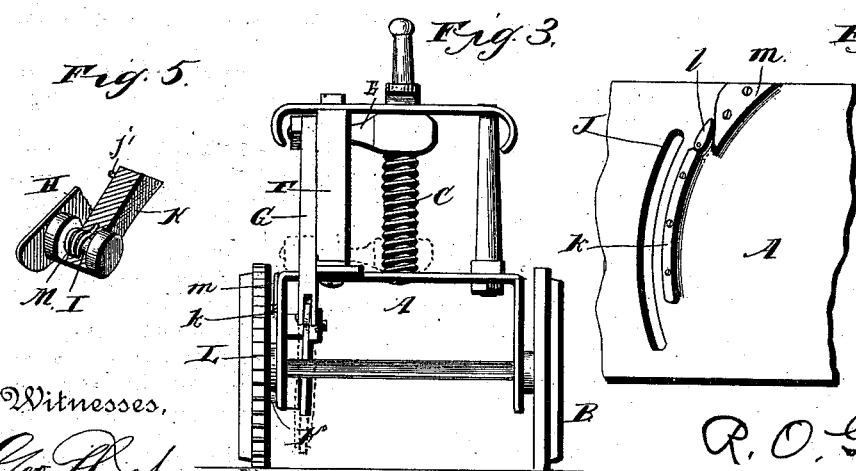

UNITED STATES PATENT OFFICE.

RUDOLF O. GERCKE, OF AUGUSTA, GEORGIA.

CAR-STARTER.

SPECIFICATION forming part of Letters Patent No. 400,560, dated April 2, 1889.

Application filed June 26, 1888. Serial No. 278,215. (No model.)

*To all whom it may concern:*

Be it known that I, RUDOLF O. GERCKE, a citizen of the United States, residing at Augusta, in the county of Richmond and State of Georgia, have invented a new and useful Improvement in Car-Starters, of which the following is a specification.

My invention is an improvement in car-starters; and it consists in certain novel features, hereinafter described and claimed.

In the accompanying drawings, Figure 1 is a side view of my device, showing the pawl in engagement with the wheel. Fig. 2 is a similar view showing the pawl raised. Fig. 3 is a front elevation showing the operating-arm in the position it assumes when the parts are arranged as in Fig. 1 in full lines, and showing by dotted lines the positions assumed in Fig. 2. Fig. 4 is a detail view showing the devices for releasing the pawl from engagement with the car-wheel. Fig. 5 is a detail view representing the end of the starting-lever and its pawl.

Referring to the drawings by letter, A designates the bottom of the car, and B the carrying-wheels, as will be readily understood. At the front end of the car-platform I erect the brake-rod or worm-shaft C, which is connected to the brakes in the ordinary or any preferred manner, and is operated in the usual way to apply the brakes. Mounted on this worm-shaft is a nut, D, having an integral arm, E, projecting to one side. This arm E plays in a slotted standard, F, erected on the car-platform at one side of the worm-shaft, and is connected by a link, G, to the car-starting lever H, which is pivoted beneath the car. The rear end of this lever is provided with an outwardly-projecting pin, I, which plays in a slot, J, in the side of the car-truck. On the outer end of this pin I pivotally mount a pawl, K, the free edge of which engages the car-starting ratchet-wheel L, and is notched to fit over the flange of said wheel, which is one of the supporting-wheels of the car. The pivotal end of this pawl is hollow, and a spring, M, is coiled around the pin I and secured to the same and the cylindrical portion of the pawl, thereby serving to keep the pawl turned normally toward the wheel. On its inner side this pawl is provided with a pin, $j$, which engages and rides upon a curved rib, $k$, a pivoted plate, $l$, and a rigid plate, $m$, secured to the side of the car adjacent to the wheel, to disengage the pawl from the wheel.

In practice, when the worm-shaft is turned to apply the brake, the rear end of the car-starting lever will be lowered and the pawl carried downward, the pin $j$ riding upon the upper edge of the curved rib until it reaches the lower end of the same, when the spring will at once throw the pawl past the rib and into engagement with the wheel. When the brake is released by turning the worm-shaft in the reverse direction, the pawl will be carried upward, thereby rotating the ratchet-wheel and starting the car. As the pawl is raised the pin rides under the rib until it reaches the rigid plate, which directs it upward and against the swinging plate, which swings upward to permit the pin to pass, after which it at once falls into its former position. The tension of the spring is thus overcome and the pawl disengaged from the ratchet-wheel, so as not to interfere with the rotation of the same nor be worn by contact therewith, and the parts are arranged to hold it out of engagement therewith as it is lowered in applying the brake.

From the foregoing description, taken in connection with the accompanying drawings, it will be seen that I have provided a very simple and compactly-arranged device. Being operated by the application and release of the brake, it will be necessarily used. The arm projecting from the nut on the worm-shaft is prevented from moving laterally by the slotted standard, so that the operation of the device is assured.

Having described my invention, I claim—

1. The combination of the car-starting lever, the brake-rod, and connections between the brake-rod and the lever, operated by the brake-rod, as set forth.

2. The combination of the worm-shaft forming the brake-rod, the car-starting lever, and the nut mounted on the worm-shaft and connected to the lever, as set forth.

3. The combination of the worm-shaft, the nut mounted thereon and having an outwardly-projecting arm, the car-starting lever, and the link connecting said arm and lever, as set forth.

4. The combination of the worm-shaft, the slotted standard arranged at one side of the same, the nut mounted on the shaft and having an arm playing in the slotted standard, the link connected to said arm, and the car-starting lever connected to said link, as set forth.

5. The combination of the car-starting lever and devices for operating the same, the pawl carried by said lever, and the spring connected to said pawl, as set forth.

6. The combination of the car-starting lever and devices for operating the same, the pawl pivoted thereto, and the rib and plates for releasing the pawl from its operative position, as set forth.

7. The combination of the car-starting lever and devices for operating the same, the pawl pivoted to said lever and having a pin on its inner side, the curved rib, pivoted plate at the upper end of the rib, and the rigid plate adjacent to the pivoted plate, the pin on the pawl riding in said rib and plates, as and for the purposes set forth.

In testimony that I claim the foregoing as my own I have hereto affixed my signature in presence of two witnesses.

RUDOLF O. GERCKE.

Witnesses:
LEOPOLD T. BLOME,
JOSHUA S. PATTERSON.